United States Patent
Yaqub et al.

(10) Patent No.: US 7,380,000 B2
(45) Date of Patent: May 27, 2008

(54) IP NETWORK INFORMATION DATABASE IN MOBILE DEVICES FOR USE WITH MEDIA INDEPENDENT INFORMATION SERVER FOR ENHANCED NETWORK

(75) Inventors: Raziq Yaqub, Stewartsville, NJ (US); Sunil Madhani, Austin, TX (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 126 days.

(21) Appl. No.: 11/161,775

(22) Filed: Aug. 16, 2005

(65) Prior Publication Data

US 2007/0041344 A1    Feb. 22, 2007

(51) Int. Cl.
G06F 13/00 (2006.01)

(52) U.S. Cl. ............... 709/224; 709/218; 709/225; 709/227

(58) Field of Classification Search ........... 709/217, 709/218, 223, 224, 225, 237, 249
See application file for complete search history.

(56) References Cited

U.S. PATENT DOCUMENTS

| | | | |
|---|---|---|---|
| 4,823,310 A | 4/1989 | Grand | |
| 5,261,069 A | 11/1993 | Wilkinson et al. | |
| 6,654,609 B2 * | 11/2003 | Kim | 455/437 |
| 6,985,745 B2 * | 1/2006 | Quaid | 455/456.2 |
| 2004/0147262 A1 * | 7/2004 | Lescuyer et al. | 455/434 |
| 2004/0176024 A1 * | 9/2004 | Hsu et al. | 455/3.04 |
| 2004/0192306 A1 * | 9/2004 | Elkarat et al. | 455/435.2 |
| 2004/0205158 A1 * | 10/2004 | Hsu | 709/218 |
| 2005/0053034 A1 * | 3/2005 | Chiueh | 370/331 |
| 2006/0083199 A1 * | 4/2006 | Yang | 370/331 |
| 2006/0172733 A1 * | 8/2006 | Benco et al. | 455/433 |

* cited by examiner

*Primary Examiner*—Viet D. Vu
(74) *Attorney, Agent, or Firm*—Stephen B. Parker; Watchstone P+D, pllc (57) ABSTRACT

A mobile device receives wireless network information from a MIIS (Media Independent Information Server), and builds its own database of existing networks with their associated characteristics, appropriately mapped with GPS (Global Positioning Satellite) coordinates or other appropriate form of geographical location identifying information. Consequently, the mobile device becomes "smart" over time through the learning process of first attempting to utilize its own developed database and, only if such database information falls short, making a remote query to a MIIS to get required information for session continuity and performing handovers. The mobile device may store the information received from the MIIS in its own local database together with a time-stamp. Each time the mobile device needs to get updated or new information, it sends a request to the MIIS along with the time-stamp appended to the request. In this way, the mobile device is sent only the information that it does not already have stored in its database.

19 Claims, 3 Drawing Sheets

FIG. 1

Figure 2a Algorithm performed in MC
(An Alternate implementation)

FIG. 2A

Figure 2b. Algorithm performed in MC
(An Alternate implementation)

FIG. 2B

IP NETWORK INFORMATION DATABASE IN MOBILE DEVICES FOR USE WITH MEDIA INDEPENDENT INFORMATION SERVER FOR ENHANCED NETWORK

BACKGROUND

1. Field of the Invention

The present application relates generally to wireless networking, and more particularly to systems and methods for supporting the seamless handoff or transfer of mobile devices across different network access points of homogeneous or heterogeneous wireless networks, whereby such mobile devices may connect to different wireless networks and/or wireless network access points as needed to maintain session continuity.

2. General Background Discussion

Internet Protocol

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer. The layers of the OSI model are listed below.

Layer 7 (i.e., the application layer) is a layer at which, e.g., communication partners are identified, quality of service is identified, user authentication and privacy are considered, constraints on data syntax are identified, etc.

Layer 6 (i.e., the presentation layer) is a layer that, e.g., converts incoming and outgoing data from one presentation format to another, etc.

Layer 5 (i.e., the session layer) is a layer that, e.g., sets up, coordinates, and terminates conversations, exchanges and dialogs between the applications, etc.

Layer-4 (i.e., the transport layer) is a layer that, e.g., manages end-to-end control and error-checking, etc.

Layer-3 (i.e., the network layer) is a layer that, e.g., handles routing and forwarding, etc.

Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as layers including the network layer or layer-3 in the OSI model and the like) are referred to as the higher-layers.

Wireless Networks

Wireless networks can incorporate a variety of types of mobile devices, such as cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data.

Wireless LANs (WLANs) in which a mobile user can connect to a local area network (LAN) through a wireless connection may be employed for wireless communications. Wireless communications can include communications that propagate via electromagnetic waves, such as light, infrared, radio, microwave. There are a variety of different WLAN standards that currently exist, such as Bluetooth, IEEE 802.11, and HomeRF.

For example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

Similarly, IEEE 802.11 specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

Wireless networks also may involve methods and protocols found in Mobile IP (Internet Protocol) systems, in PCS systems, and in other mobile network systems. With respect to Mobile IP, this involves a standard communications protocol created by the Internet Engineering Task Force (IETF). With Mobile IP, mobile device users may move across networks while maintaining their IP Address assigned once. See Request for Comments (RFC) 3344. Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address by using a protocol such as Internet Control Message Protocol (ICMP).

In basic IP routing, routing mechanisms typically rely on the assumptions that each network node always has a constant attachment point to the Internet and that each node's IP address identifies the network link it is attached to. In this document, the terminology "node" includes a connection point, which can include a redistribution point or an end point for data transmissions, and which can recognize, process and/or forward communications to other nodes. For example, Internet routers can look at an IP address prefix or the like identifying a device's network. Then, at a network level, routers can look at a set of bits identifying a particular subnet. Then, at a subnet level, routers can look at a set of bits identifying a particular device. With typical mobile IP communications, if a user disconnects a mobile device from the Internet and tries to reconnect it at a new subnet, then the device has to be reconfigured with a new IP address, a proper netmask and a default router. Otherwise, routing protocols would not be able to deliver the packets properly.

Handoffs of Mobile Devices

In the context of a mobile device with an IP-based wireless network interface, the mobile device needs to perform roaming or handoffs when it moves from one network to another network, or from one access point of a network to another, in order to maintain session continuity, thus making it imperative for a mobile device to find immediately an appropriate point of network attachment and remain connected to ensure session continuity. With existing handoff methodologies, handoff is typically accomplished by performing the following sequence of protocol layer specific handoffs:

First, handoff takes place at the physical layer. In this regard, the mobile device switches its radio channel to a wireless base station or wireless access point in the target network.

Second, handoff takes place at layer-2. In this regard, the mobile device switches its layer-2 (i.e., link-layer) connections to the target network. As explained above, the link layer or layer-2 refers to the protocol immediately below the IP-layer that carries user traffic. The mobile device performs layer-2 authentication with the target network if the target network requires such authentication.

Third, handoff takes place at the IP-layer. In this regard, the mobile device obtains a local IP address from the target network, performs IP-layer authentication if required by the target network, and then performs IP-layer location update so that IP packets destined to the mobile device can be routed by the IP network to the mobile device via the target network. In some instances, one way to support IP layer location update is to use Mobile IP defined by the Internet Engineering Task Force (IETF).

Fourth, handoff takes place at the application-layer. The mobile device performs necessary steps at the application layer to ensure that its application traffic will flow correctly to the applications on the mobile device via the target network. For example, when the mobile device uses the Session Initiation Protocol (SIP) defined by the IETF to manage its application-layer signaling, an application layer handoff can be achieved by the mobile device updating its current location with its home SIP server. The mobile device may also need to carry out application-layer authentication with the target network if required by the target network. This is the case, for example, when the mobile device is using the IP Multimedia Subsystem (IMS) in a visited 3GPP ($3^{rd}$ Generation Partnership Project) wireless network, where the IMS is a SIP-based system supporting application-layer signaling and management for multimedia applications over 3GPP networks.

Media Independent Information Servers and Access Point/Network Handoffs

Network Discovery refers to the identification of an appropriate point of network attachment that meets the application requirements and the characteristics of the mobile device, in a timely, accurate and efficient manner. It is important for the mobile device to obtain this information before it becomes necessary to carry out a handoff or connectivity transfer operation. Network Discovery thus involves obtaining network information when a mobile device has IP connectivity. Network information is any information that is used by a mobile device for identifying networks, and seamlessly transitioning from one network connection to another. The network connections may be homogeneous (e.g., access points belonging to the same network) or heterogeneous (e.g., access points belonging to different networks). With the proliferation of wireless network service providers, seamless handover across heterogeneous networks is becoming as important as handover between homogeneous networks. However, heterogeneous handover requires the following key capabilities:

Real-Time Information Availability: To discover the most recent and accurate information of various network elements of available networks as that information becomes available.

Quick Network Discovery: To discover the existence of available networks and information regarding the networks to which the mobile device may connect in a handover operation.

Quick Selection of Candidate Networks: To quickly select one network that the mobile device will prefer to use, when multiple networks are available at the same time.

Proactive Handover Actions: To perform required handover actions before the mobile device is actually handed over to a target network to reduce delay and possible session discontinuity. For example, the mobile device may pre-acquire a local IP address and perform pre-authentication with a target network while still connected to a first network, so that when the time comes for the handover, the mobile is already assigned a valid IP address and already is authenticated with the target network.

Network Discovery and acquisition of a local IP address can be performed either by direct interaction of the mobile device with the candidate network(s), or through sending of queries to a Media Independent Information Server (MIIS), the location of which the mobile device is assumed to be aware. MIIS is a server that provides users with useful information for making effective handover decisions. The MIIS query is the latest approach in seamless wireless network handoff, being still in the research phase and extensively discussed among peers in the industry, such as the IEEE 802.21 Working Group. In its present state of development, the MIIS query is contemplated to be triggered by variations in radio signal strength. Thus, any perceived weakness in the radio signal quality will cause a query to be sent to the MIIS asking for the list of available neighborhood networks and their associated parameters.

However, the present inventors believe that the variation of radio signal strength could be reflective of an actual network deterioration necessitating the switching of a mobile device from one network to another, or it could be a false alarm because of inherent characteristics of network radio signals that result in transient variations. Consequently, where the perceived network deterioration because of signal strength variation is false, the mobile device will unnecessarily send MIIS queries and will repeatedly receive the same superfluous information. Further, a mobile device is likely to repeatedly traverse the same geographical area (e.g., an office employee will mostly travel from home to office and back). Consequently, repeatedly sending MIIS queries to get information pertaining to the same geographical coordinates will generate an unnecessary signaling burden. There thus exists a need in the art for improvement in the interactivity between mobile devices and MIIS apparatus.

SUMMARY OF THE PREFERRED EMBODIMENTS

The preferred embodiments of the present invention fulfill the existing need as explained above, by providing systems and methods for efficiently acquiring network discovery information by a mobile device. According to various aspects of the invention disclosed hereinbelow:

A mobile device, whenever it receives information from a remote MIIS, saves the information for future use. Consequently, the mobile device builds its own local database of existing networks with their associated characteristics, appropriately mapped with GPS (Global Positioning System) coordinates or other appropriate form of geographical location identifying information.

As a consequence of the above, a mobile device becomes "smart" over time through the learning process (e.g., it builds its own local database over the time). Thus, it first attempts to utilize its own developed database and, only if such database information falls short, makes a remote query to a MIIS to get required information for session continuity and performing handovers.

The mobile device may store the information received from the MIIS in its own local database together with a time-stamp. Each time the mobile device needs to get updated or new information, it sends a request to the MIIS along with the time-stamp appended to the request. The time-stamp enables the mobile device to fetch information from the MIIS only if:

(i) the desired information is not available at all in the mobile device's local database;
(ii) the available information is considered to be old enough that an update should be obtained; or
(iii) a Network Stability Index (NSI), which is established through the learning process, is low. NSI is determined based on the frequency of changes/evolutions experienced by the mobile device in a given period of time. In other words, the mobile device looks at its database to determine how many times updates were obtained for a given network. If the mobile device finds that a database entry has been updated/modified more than a certain number of times in a given period of time, the given network is considered unstable for the given time period and the NSI may be decremented or reduced. On the other hand, if the mobile device finds that an entry has not been updated/modified at all over a given period of time, the given network may be considered to be stable over such period. Based on this observation, the NSI can be increased or incremented by some discrete value.

The time-stamp also facilitates the fetching of only delta information from the MIIS (i.e., the difference between the information stored in the mobile device's database and the information held by the MIIS). Thus, the time-stamp based query causes the MIIS to send only the updates, if any exist, after the time specified in the time-stamp appended to the MIIS query. The MIIS will accordingly respond with only the updates instead of flooding the mobile device with information that the mobile device might already have.

The preferred embodiments of the invention thus make the mobile device MIIS query and response communication optimum and efficient. This will not only reduce superfluous traffic on the network but also will eliminate unnecessary burdens on the MIIS, thus making the interaction between the MIIS and the mobile device faster and more effective.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

In conjunction with describing preferred embodiments of the invention, a brief discussion of current MIIS functionality will first be provided. MIIS maintains updated information about networks, lower layers and available information about higher layer services. The information contained by the MIIS can be classified generally into three groups:

1. General Network Information (GNI): includes a general overview of the network such as Network ID, Location of different PoAs (Point of Access) in the Network, the IP Version(s) supported by the Network, Network Operator (service provider), etc.
2. Link Layer Information (LLI): includes information related to neighbor maps and link layer parameters (channel, frequency, PHY (physical) types, data rates, neighbor information, security, QoS, etc.
3. Higher Layer Information (HLI): includes higher layer services or applications that are supported by the network. For example, Internet connectivity, Multimedia Message Service (MMS), Mobile IP (MIP), Virtual Private Network (VPN), VoIP, e-mail, Ipsec, Streaming Media, Pricing of Access (e.g. fee versus free access), Use of NAT, Roaming Partners, etc. would constitute HLI.

The above information has an associated time-stamp. MIIS provides the above information to a mobile device when the mobile device sends a query so that it can make a proper handover decision when roaming across either homogeneous or heterogeneous networks. While all of the above information service elements are necessary and will be available via an 802.21 information service framework, LLI will be mostly available directly through media specific technologies. In cases where media specific amendments are not available or not possible, link layer information can be enabled via higher layer information. The following table provides a list of Information Elements (IEs) that can be retrieved from the MIIS:

TABLE 1

| Information Element | Examples |
| --- | --- |
| List of available networks and standards | 802.3, 802.11(a, b, g), 802.15, 802.16, GSM, GPRS, 3GPP, 3GPP2, etc. |
| ID of PoA | PoA ID based on location. |
| Network Identifier | SSID in 802.11 or ITU-T E.212 MCC + MNC |
| Name of Operator/ Network Provider | Vodafone, Orange, etc. Could be equivalent to Network ID. |
| IP Version supported | IPv4 and/or IPv6 |
| Roaming Partners | In form of NAIs or MCC + MNC |
| Cost for service/ network usage | Flat rate, hourly, day or weekly rate |
| Neighbor networks Information | Technology specific information |
| Link layer security supported | WEP in 802.11, 802.11i, PKM in 802.16 UEA in 3G, |
| Quality of Service | BER, SNR, Data Rate Kbps, Latency |
| Access Route Information | Access Router Address, IP version, Mobility Protocol Support |
| Cellular networks specific service supported | IMS, MMS, SMS, Presence, instant messaging, Push-to-Talk etc. |
| 802 networks specific services supported | Location, VPN, NAT, MIP versions and services, etc. |

Another capability of the MIIS is keeping a Media Independent Neighbor Graph (MING). MING contains a set of different types of neighbors relative to a given PoA. This set can be kept by the MIIS functional entity and can help a mobile device to identify quickly the potential candidate PoAs for handover. A MING may be manually configured, e.g., manually listing the neighbors for a given AP, or via a PoA that can learn about its neighbors of other media types dynamically through the course of report/response message exchanges. Similarly, an updated record of Information Elements can be maintained by having reporting agents that when traversing certain networks send the essential information about those networks to the MIIS. Enhancements in such MIIS capabilities are part of the present invention and are described below.

MIIS is also capable of being accessed from any single network. Thus, for example, using an 802.11 access network it may be possible to get information not only about all other 802 networks in a particular region but also that of 3GPP and 3GPP2 networks as well. Similarly using a 3GPP2 radio transmission, it may be possible to get access to information about all 802 and 3GPP networks in a given region. This capability allows a mobile device to use its currently active access network and scan for other available access networks in a particular geographical region. Thus a multi-interface mobile device does not have to power up each of its individual radios to get information pertaining to each network corresponding to such radios.

In accordance with the preferred embodiments of the invention, it is proposed that MIIS be capable of receiving information from the reporting agents and storing it together with a time-stamp. It is also proposed that the MIIS be capable of rejecting received information if that information is a duplicate of previously stored information. These capabilities are not present in the MIIS that is presently under research.

A mobile device in accordance with the present invention would be provided with multiple radio network interfaces, such as IEEE WLAN interfaces (e.g., 802.11, 802.16, and 802.21 interfaces) and 3GPP/3GPP2 cellular network interfaces (e.g., WCDMA, GPRS, GSM, cdma2000). When a mobile device moves about in a particular region, it may need to execute a handover between WLANs, or between a WLAN and a cellular network. When the mobile device is covered in the region by multiple WLANs simultaneously, it needs to select one WLAN to use if it decides to use a WLAN.

In accordance with one embodiment of the invention, the mobile device will:

1. Receive network information by detecting and receiving radio signals in its current geographical neighborhood. The mobile device may be either in idle mode or in connected mode. In connected mode, it discovers additional information (for instance higher layer information), as compared to idle mode where it perceives PHY layer information only (for instance Service Set Identifiers (SSIDs));
2. Receive desired information about the networks by communication with MIIS. The mobile device either may wish to get the information about the networks in its current neighborhood or in the upcoming neighborhood that the mobile device is heading towards. Communication with MIIS also may be commenced in the idle mode (i.e., when the mobile device is not actually involved in any active session) or carried out in the background when the active session is ongoing. The idle mode communication option can be activated when the mobile device is connected to an exhaustible power supply (car battery, battery-powered AC supply, etc.) for battery power saving;
3. Retain the information that it receives from the above noted methods even after it disconnects, leaves the neighborhood, or ends the session with MIIS. The mobile device will save the information in its local memory dully mapped with location coordinates and mapped with a time-stamp. This enables it to establish its own local database of networks. Location coordinates can be obtained from a built-in GPS device or other device having access to GPS or similar locational coordinates. The time signal for the time-stamp can be received from a built-in clock, a GPS clock or any other radio clock. Either GPS or a radio clock is recommended on accuracy and synchronism grounds. The information received from MIIS can be saved as is and updated only when the mobile device again connects to the target network, if it happens to come back to the same neighborhood in the future;

4. Reuse the information saved in its own local database if it comes back to the same neighborhood in the future. This saves the mobile device from having to re-sense the PHY layer or re-query the MIIS.

5. Fetch only the delta information from MIIS based on the time-stamp. The time-stamp based query will ask MIIS to send only the updates, if present, after the time specified in the time-stamp attached to the query. The MIIS will accordingly respond with the delta updates instead of flooding the mobile device with the information that it already has. (The time-stamp is a part of the message format. It essentially makes the query appear like "Send me the requested information if you have updated information after time xx:yy; if you do not have any updates available after time xx:yy, then do not send).

Thus, the preferred embodiments of the invention provide the following functional components:

a) Storing a recent history of movements of a mobile device in its own local database.

b) Storing the identifications of WLANs and their IEs, which the mobile device either actually connected to or traversed in the movement pattern.

c) Communicating with MIIS to discover the Networks and their IEs, and storing the received information. The mobile device will receive the full information about the networks only if it does not currently exist in the mobile device's database. Alternately, the mobile device will receive either confirmation that its existing information is up to date, or delta updates if the information is old. The MIIS queries appended with time-stamps facilitate achievement of these objectives.

d) Storing the information received in steps a, b and c mapped together with GPS coordinates and time-stamps.

e) Selecting the most suitable candidate network based on the location coordinates and user criteria and offering the user the selected candidate while the session is ongoing.

f) Performing pre-authentication with the selected network and making the target network ready for the possible handover.

g) Recording a log of performance of the networks used.

These steps will populate the mobile device's own database and prioritize the candidate networks according to the user's preferred criteria. The stored advance knowledge will reduce the network detection time; help proactively decide the next attachment point to be used, and perform a proactive Vertical or Horizontal handover. The pro-active handover actions include acquiring a local IP address from, or performing pre-authentication with, the target network. These enable the user to attain seamless roaming across several radio networks.

Figure 1:
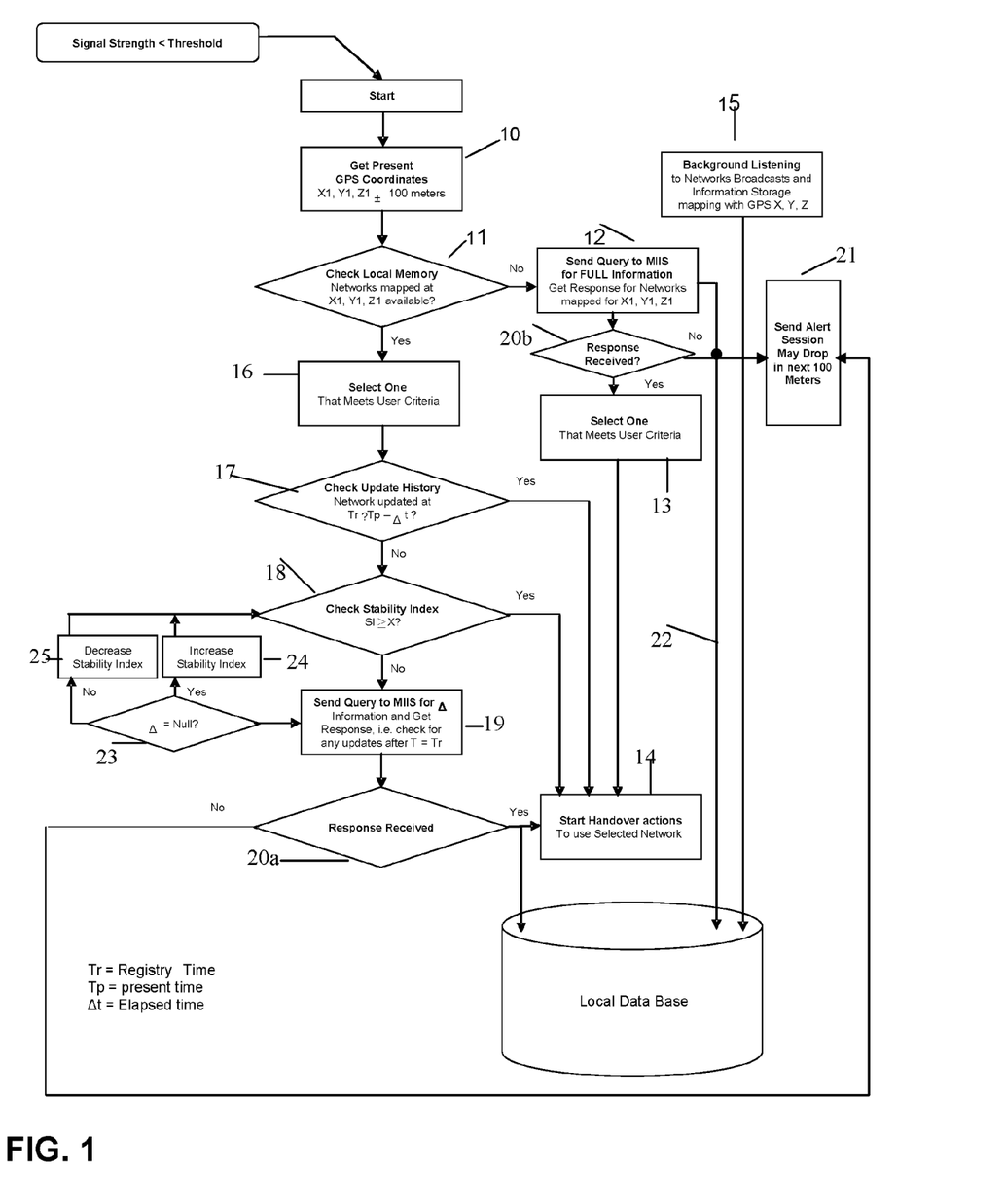
FIG. 1 is a flow diagram illustrating an implementation of a MIIS query in conjunction with a handover process by a mobile device Client according to one preferred embodiment of the invention.

Referring now to FIG. 1, an example of mobile device functionality in accordance with the principles of the invention is described. First, the variation in the received signal strength triggers the mobile device to get GPS parameters (Step 10) and check the local memory to check for the existence of networks in proximity to the current geographic location (a 100 meter range is shown in the figure for the sake of example) (Step 11). If the mobile device does not find the availability of networks in the local database, it sends a query to MIIS for full information (Step 12). The information received in response from MIIS (Step 20*b*) is used for handover (Steps 13, 14). Besides using the acquired information for handover, it is also saved in the local database (Step 15).

On the other hand, if the mobile finds the availability of networks in the database, it selects one according to the user preference (Step 16). User preferences may be based on Security, or Cost, or Performance, or Capability of Interfacing with Cellular Networks. User preference may vary from user to user or from time to time even for the same user. A process coupled with user interface (not shown in the figure) can be used to realize this feature.

After selecting a potential candidate network using the local database, the algorithm checks the update history to determine how old the information in the database is (Step 17). If the retrieved information has been updated within the set elapsed time $\Delta t$ and is deemed usable, then the algorithm advances to start handover actions. (Step 14). On the other hand, if the update history indicates that a significant amount of time has elapsed since the last update, the algorithm checks the Network Stability Index (NSI) (Step 18) which is evaluated based on how frequently the network parameters varied over a given period of time. A high NSI indicates an excellent stability record and reveals that query to MIIS to get update at this time is not necessary. Accordingly, in this case the algorithm advances to start handover actions (Step 14). The NSI can also be made a function of time so that it gradually decreases with the passage of time ensuring that after a sufficiently long course of time, updated information must be obtained from MIIS.

If the time elapsed since the last update is greater than the set $\Delta t$, and the NSI is below a certain preset threshold, the algorithm initiates communication with MIIS to get the updates (Step 19). If the response of MIIS query (Step 20*a* or Step 20*b*) is negative (i.e., no networks are available, then an alert can be sent to the user saying for example that "session may be dropped in next 100 meters" (Step 21). The same can also be stored for future use (Step 22).

Concurrently with the checking of the NSI at step 18, the number of times that the information has been updated (i.e., the number of deltas) within the predetermined time period is checked at Step 23. If it is found that no variation occurred in network parameters over the extended period of time, it is assumed that the network is relatively stable and the NSI is increased (Step 24). If it is found that variations did occur, the NSI is decreased (Step 25). After each increase or decrease of the NSI, processing returns to Step 18 to re-check the NSI value to determine acceptability.

Figure 2A:
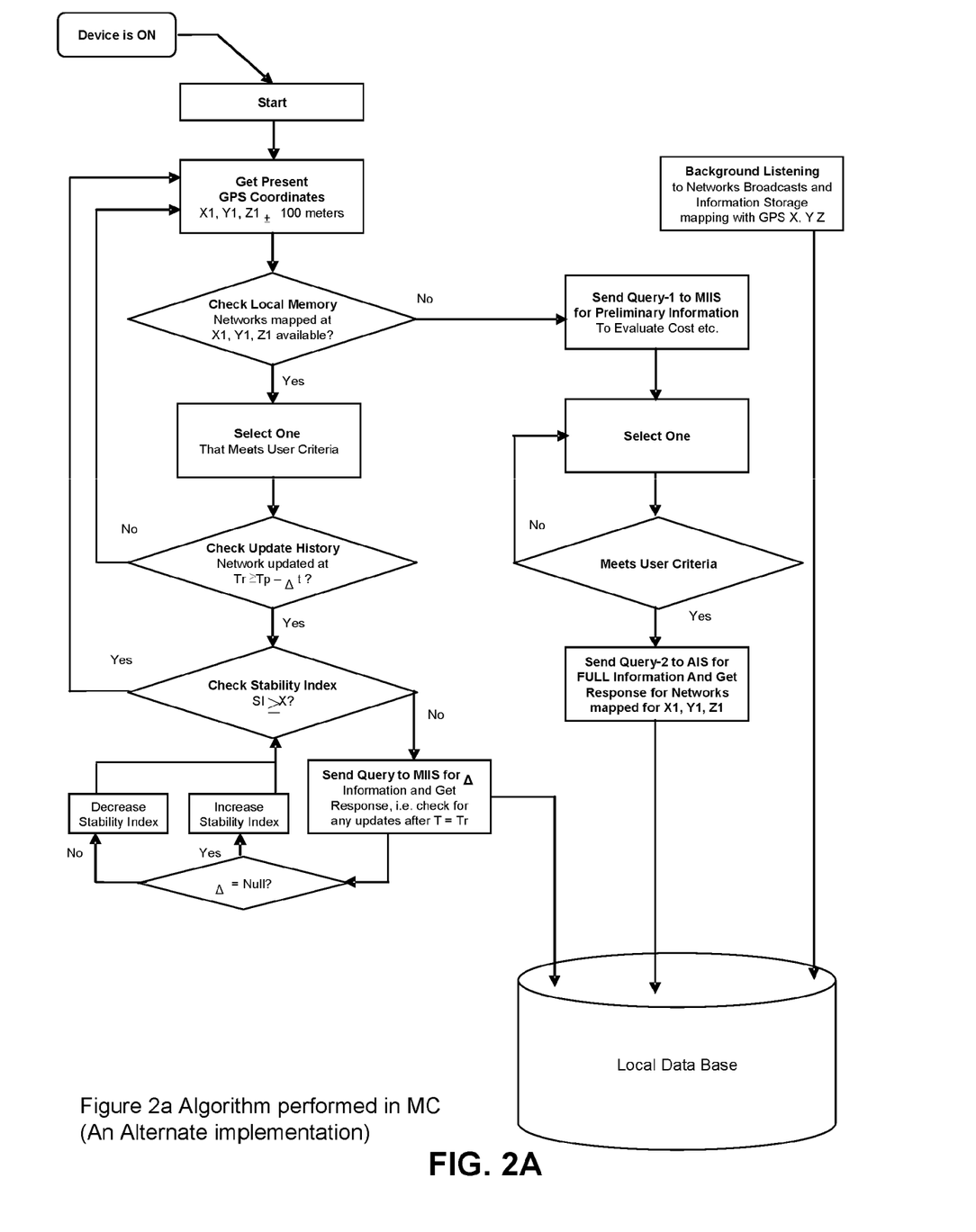
FIG. 2A is a flow diagram illustrating an implementation of a MIIS query in conjunction with updating database information by a mobile device Client when traversing a particular geographic region, according to another preferred embodiment of the invention.
Figure 2B:
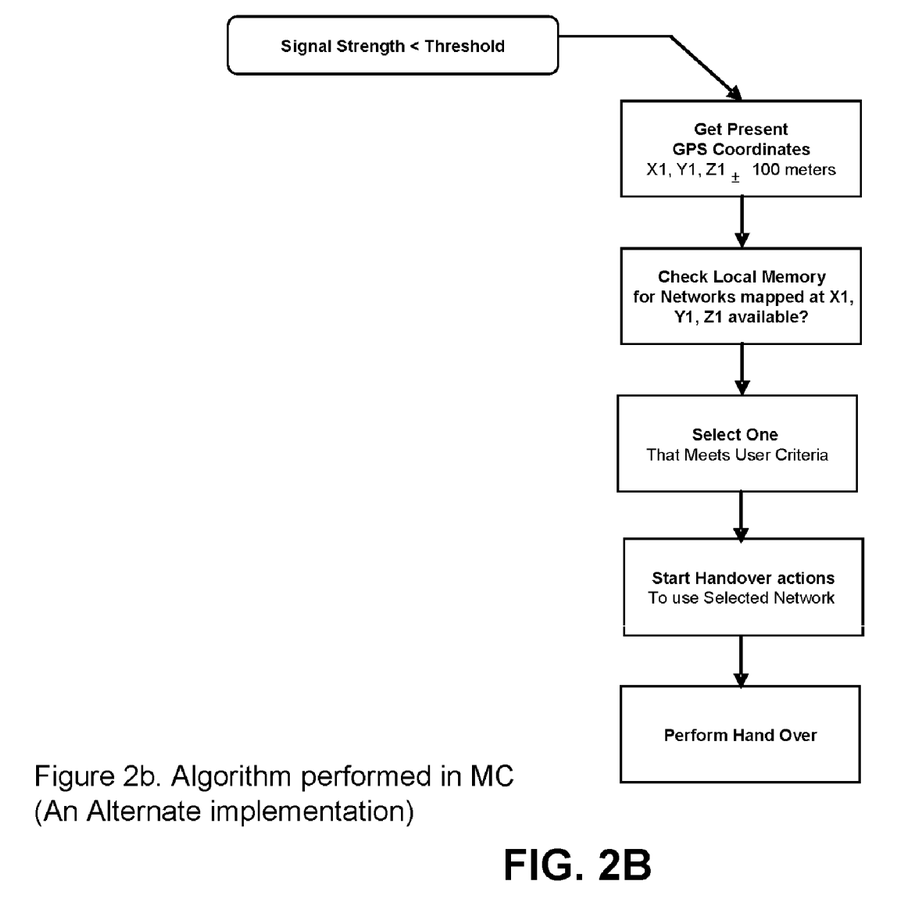
FIG. 2B is a flow diagram illustrating an implementation of a handover process by a mobile device Client according to another preferred embodiment of the invention, when updated database information is automatically performed as in FIG. 2A.

FIGS. 2A and 2B show alternate implementations of the same concept as FIG. 1. The algorithm shown in FIG. 2A tracks Steps 10-13, 16-19 and 23-25 of FIG. 1, and is used solely to build the local database whenever the mobile device is ON. As such the explanation of these steps will not be repeated. The process can run either in the background or parallel to a main session. The algorithm shown in FIG. 2B is used in conjunction with the continuous database building algorithm of FIG. 2A and tracks Steps 10, 11, 16 and 14 of FIG. 1, and is used only to select a network for handover. As such, the explanation of these steps will not be repeated. As shown, a preliminary query can be sent to the MIIS for general information only relating to cost, features, etc. of available networks, followed by selection of the available networks that meet with user-specified preferences. A subsequent query is then sent to request full network information for the network(s) that meet the user's specified criteria.

Thus, using the algorithms of FIGS. 2A and 2B, the mobile device will always check its database as it traverses a particular geographic region to determine whether network information is stored for such region; send a MIIS query to build its database if no information is stored; send an update MIIS query if stored information is old and needs to be updated; and will look for a candidate network in its local database when a handover is necessary, select a candidate network from the local database, and perform the handover process.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of performing a handoff operation for a wireless IP mobile device, comprising the steps of:

providing a local database in said mobile device that stores wireless network information;

comparing a received signal strength of said mobile device with a threshold value, and if said received signal strength is determined to be weak as compared with said threshold value, checking said local database for available wireless networks in a current geographic region in which said mobile device is located and initiating handoff actions to a target network if an available network exists as stored in said database;

if no available network information for said region exists in said database, sending a query to a MIIS for available network information, and initiating handoff actions to a target network if an available network exists as indicated in a response from said MIIS.

2. The method of claim 1, further comprising the step of obtaining geographical coordinates to determine a present geographic region location of said mobile device.

3. The method of claim 1, further comprising the step of storing network information received in response to a query to said MIIS in said local database.

4. The method of claim 1, further comprising the steps of storing network information received in response to a query to said MIIS in said local database, and associating a time-stamp with information stored in said local database, where said time-stamp indicates the time that said information has been updated.

5. The method of claim 4, further comprising the steps of determining whether network information stored in said local database is in need of being updated by comparing a current time with said time-stamp, sending a MIIS update query including said time-stamp to said MIIS if stored network information needs updating, and updating said network information with updated information received in an update response from said MIIS.

6. The method of claim 5, wherein the updated information provided by said MIIS includes only information that is different from the network information already stored in said local database.

7. The method of claim 5, further comprising the step of creating a Network Stability Index (NSI), which is indicative of the frequency with which network information updates are provided for a certain network over a predetermined period of time, and storing said NSI in said local database.

8. The method of claim 7, further comprising the step of consulting said NSI when it is determined that stored network information is determined to need updating, and proceeding to send an update MIIS query if the value of said NSI is below a predetermined threshold indicative of sufficient network stability.

9. The method of claim 7, further comprising the step of consulting said NSI when it is determined that stored network information is determined to need updating, and refraining from sending an update MIIS query if the value of said NSI is at or above a predetermined threshold indicative of sufficient network stability.

10. The method of claim 8, further comprising the step of decreasing said NSI value when network update information is received within said predetermined time period.

11. The method of claim 8, further comprising the step of increasing said NSI value when no network update information is received within said predetermined time period.

12. The method of claim 2, wherein the step of obtaining geographical coordinates comprises the step of receiving GPS signals.

13. A method of maintaining a network information database in a wireless IP mobile device, comprising the steps of:
- providing a local database in said mobile device that stores wireless network information;
- checking said local database for available wireless networks in a current geographic region in which said mobile device is located;
- if an available network exists as stored in said database, determining whether stored network information of said available network needs to be updated, sending a MIIS update query to a MIIS if said stored network information needs updating, and updating said network information with updated information received in an update response from said MIIS;
- if no available network information for said region exists in said database, sending a query to said MIIS for available network information, and storing network information received in a response from said MIIS in said database.

14. The method of claim 13, further comprising the step of obtaining geographic coordinates to determine said current geographic region.

15. The method of claim 13, wherein the step of determining whether stored network information needs to be updated comprises the step of comparing a stored time-stamp, regarding when the information was last stored in said local database of said mobile device, associated with said stored network information with a current time, regarding when the information was last stored in a database of said MIIS.

16. The method of claim 15, wherein said time-stamp is appended to said MIIS update query.

17. The method of claim 15, wherein the step of determining whether stored network information needs to be updated comprises the further step of consulting a Network Stability Index (NSI) when result of said comparison indicates a need for network information update, and sending a MIIS update query only if a value of said NSI is below a predetermined network stability threshold level.

18. The method of claim 13, wherein the step of sending a query to said MIIS for available network information comprises the steps of:
- sending a preliminary query for general network information;
- comparing received general network information with user-specified preferences; and
- sending a second query to receive full network information for at lease one network that meets said user-specified preferences.

19. A method of performing a handoff operation for a wireless IP mobile device, comprising the steps of:
- providing a local database in said mobile device that stores wireless network information;
- said mobile device comparing a received signal strength of said mobile device with a threshold value, and if said received signal strength is determined to be weak as compared with said threshold value, and checking said local database for available wireless networks in a current geographic region in which said mobile device is located and initiating handoff actions to a target network if an available network exists as stored in said database;
- wherein information in said local database is obtained and updated in accordance with the method as set forth in claim 13.

* * * * *

UNITED STATES PATENT AND TRADEMARK OFFICE
CERTIFICATE OF CORRECTION

| | | |
|---|---|---|
| PATENT NO. | : 7,380,000 B2 | Page 1 of 1 |
| APPLICATION NO. | : 11/161775 | |
| DATED | : May 27, 2008 | |
| INVENTOR(S) | : Yaqub et al. | |

It is certified that error appears in the above-identified patent and that said Letters Patent is hereby corrected as shown below:

On the Title Page, Item (74), under "Attorney, Agent, or Firm", in Column 2, Line 2, delete "Watchstone P+D, pllc" and insert -- Watchstone P&D, PLLC --, therefor.

In the Drawings

In Fig. 2A, Sheet 2 of 3, delete "meats" and insert -- meets --, therefor.

In Fig. 2A, Sheet 2 of 3, delete "Y Z" and insert -- Y, Z --, therefor.

In the Specification

In Column 7, Line 16, delete "Ipsec," and insert -- IPsec, --, therefor.

In Column 9, Line 14, delete "MIIS." and insert -- MIIS; --, therefor.

In the Claims

In Column 12, Line 6, in Claim 1, delete "value," and insert -- value; --, therefor.

In Column 14, Line 15, in Claim 18, delete "at lease" and insert -- at least --, therefor.

Signed and Sealed this
Eighteenth Day of November, 2014

Michelle K. Lee
*Deputy Director of the United States Patent and Trademark Office*